Nov. 7, 1950 — F. W. REILLY — 2,528,548
POWER DISCONNECT SWITCH
Filed April 30, 1945 — 2 Sheets-Sheet 1

INVENTOR
Frank W. Reilly
BY
Austin, Wilhelm & Carlson
ATTORNEYS

Nov. 7, 1950          F. W. REILLY          2,528,548
POWER DISCONNECT SWITCH

Filed April 30, 1945          2 Sheets-Sheet 2

INVENTOR
Frank W. Reilly
BY
Austin, Wilhelm & Carlson
ATTORNEYS

Patented Nov. 7, 1950

2,528,548

UNITED STATES PATENT OFFICE 2,528,548

POWER DISCONNECT SWITCH

Frank W. Reilly, Auburndale, Mass.

Application April 30, 1945, Serial No. 591,122

12 Claims. (Cl. 200—6)

1

The invention relates to electric switchgear and more particularly to power disconnect switches.

This application constitutes a continuation-in-part of copending application, Serial No. 410,718, about to issue on May 1, 1945, as Patent No. 2,374,703.

The invention has for its general object to provide a disconnect switch which is less expensive to manufacture, more reliable and capable of a wider field of use.

More specifically, an object of the invention is to provide a disconnect switch for use with poly-phase electric power and capable of being thrown to a plurality of selected positions including two power transfer positions and an off-position. A further object is to provide such a switch with an all clear position in which it may be inspected and repaired.

According to a preferred form of the invention, the disconnect switch comprises a supporting plate from which a metal framework depends. Suitably journaled in the interior of this framework is a single sturdy operating shaft. Rigidly secured to this shaft are post insulators carrying rigidly connected sector-shaped jaw contacts. Secured on three of the four sides of the metal framework are horizontal insulator bars supporting stationary contact tongues, the central tongues adapted to be selectively connected to the tongues on either side thereof by the sector jaws. The shaft also has a plurality of sector-shaped barriers rigidly mounted thereon and disposed between and beyond the several sector jaws. The switch may be enclosed within a tank suspended from the top plate which may be filled with a suitable dielectric liquid, or it may be operated in air with or without a protective casing.

Disconnect switches are usually used in power circuits and often for the purpose of selectively connecting a circuit to one or more sources of electric power. These switches do not interrupt electric power but are used with circuit breakers which interrupt the electric power. Sometimes these switches are used without circuit breakers to make and break circuits carrying line charging currents or transformer magnetizing currents. These charging and magnetizing currents oftentimes cause serious arc-overs which may lead to serious short circuits and great damage to persons and property. These switches are of a type usually called upon to handle sizeable amounts of power including fairly heavy currents at medium to high voltages.

2

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Figure 1:
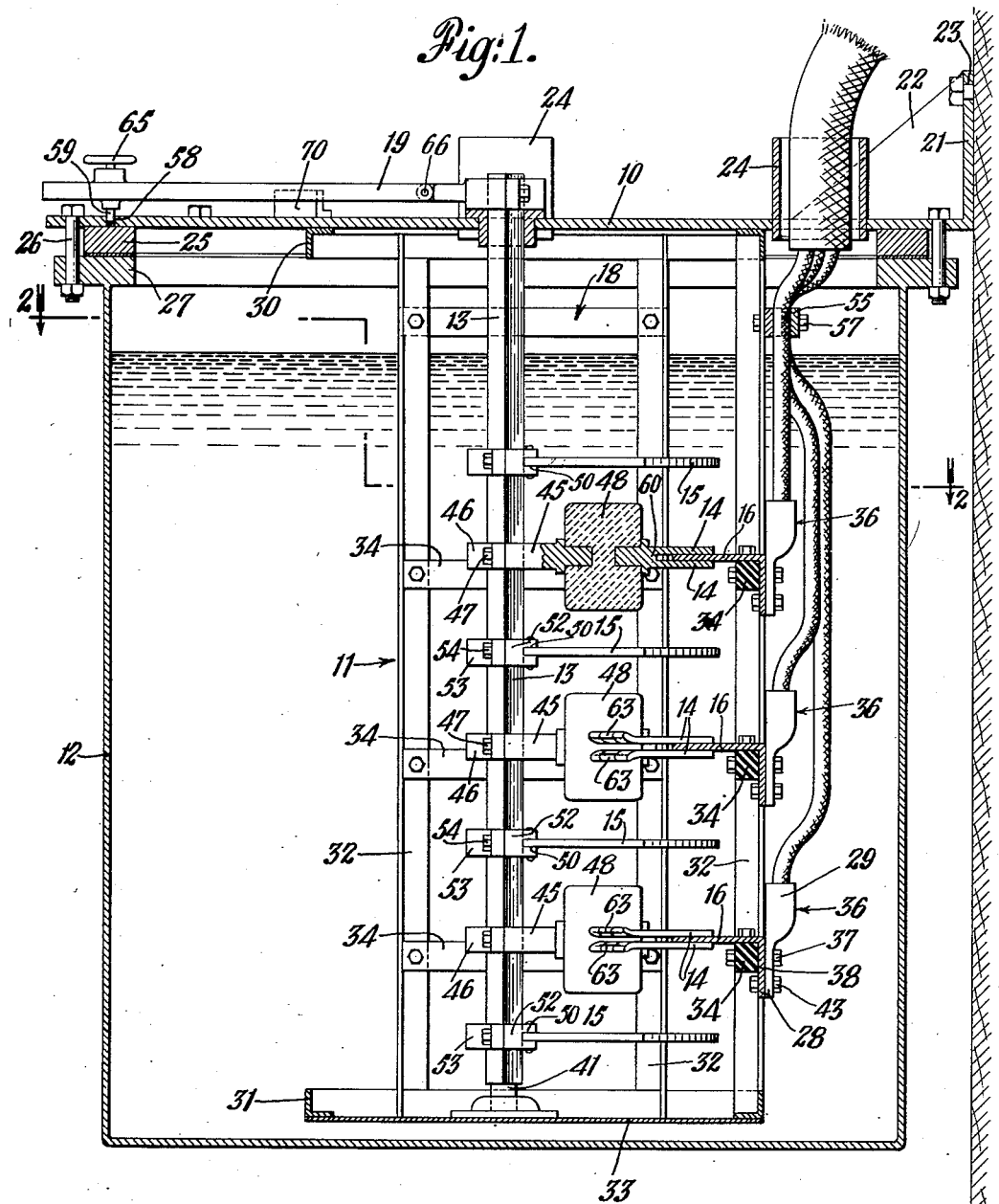
Fig. 1 is a vertical elevation of the disconnect switch, parts being broken away to better illustrate the construction, taken on the line 1—1 of Fig. 2.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawing, the disconnect switch comprises in general a top mounting plate 10 supporting a depending framework 11 and a removable tank 12. Journaled in the framework is a single metal shaft 13 carrying a plurality of sector jaws 14 and insulating barriers 15. The sector jaws 14 selectively engage a center contact tongue 16 and end contact tongues 17. The frame has suitable cable supports 18 for leading the cables to the several stationary contacts and the switch is operated by a handle 19 on the top of the mounting plate, the handle being directly mounted upon the main shaft 13.

The top plate 10 is semi-circular with rectangular corners having an upstanding flange 21 and strengthening webs 22. Flange 21 has suitable holes 23 for fastening the switch to a suitable wall support in such manner that the removable tank 12 may be dropped for inspection, maintenance or repair of the switch. The top plate has conduit tubes 24 for connection to the incoming and outgoing conduits which house the connecting cables. The top plate has a ring 25 to which is bolted a heavy ring 27 attached to oil tank 12 by suitable bolts 26. If desired, a suitable gasket may be interposed between rings 25 and 27.

The depending framework 11 is made up generally of metal structural members comprising a top square frame 30 and a bottom square frame 31 connected by vertical stringers 32. There are two stringers 32 on each of three sides spaced inwardly from the corner of the frame. The fourth side is free of stringers for a purpose hereinafter explained. The bottom frame 31 has a bottom plate 33 to impart rigidity to the framework and to support the main shaft 13 as explained hereinafter.

The frame supports a plurality of insulator bars 34 which may be of ebony asbestos or other suitable insulating material having the proper insulating, dielectric and structural characteristics. These insulator bars 34 are disposed on three sides of the square framework and are bolted to and between the vertical framework members 32 on their respective sides.

Figure 4:
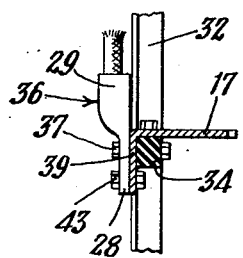
Fig. 4 is a detail on the line 4—4 of Fig. 2.

The insulator bars 34 support the stationary contact tongues 16 and 17 which have depending portions 38 and 39 connected to the insulator bars 34 by bolts indicated in general by 37. The several contacts 16 and 17 have cable terminals 36 having flanges 28 and sockets 29 in which the conductor wires are secured. Bolts 43 connect the flanges 28 to the depending portions 38 and 39 as shown in Fig. 4.

The center tongue 16 is wider than the end tongues 17 and the inner edge of each of the tongues describes a circle whose center is the axis of shaft 13.

The shaft 13 is made of square metal stock and has a lower stepped journal portion 41 journaled in a step bearing mounted upon bottom plate 33. The upper end of square shaft 43 is suitably journaled in a bearing in top plate 10. The square end of the shaft projects above the plate 10 for engagement with the operating handle 19.

The square shaft 13 carries a plurality of cantilever operating arms, three being shown in a three-phase construction. Each arm comprises a metal fitting 45 having a strap 46, the fitting and strap having angular recesses to fit the square shaft and being connected by removable bolts 47. Secured to the fitting 45 is a post insulator 48 to which is secured the sector or arch shape jaws 14.

The sector jaws 14 are connected together as indicated at 60 to provide relatively free ends 61 which may be slitted as indicated to form resilient fingers 62 having flared ends 63. The inner and outer edges of the sector jaws describe circles whose center is the axis of shaft 13.

The insulating barriers 15 are indicated as being of general sector or pie-shape and may be made of suitable insulating material having the necessary insulating, dielectric and flash-over resisting properties. These barriers are supported by fittings 52 having removable straps 53 secured thereto by bolts 54 in a manner generally similar to the construction and mounting of the similar parts on the cantilever arms. The barriers 15 may be suitably secured in slots 50 on the fittings 52.

It will be noted that the insulating barriers 15 extend substantially beyond the sector jaws 14 both radially and circumferentially so that as the sector jaws leave the end tongues 17, any arc drawn between the separating contacts is confined between the barriers.

The cable supports 18 comprise insulating strips or cleats 55 having holes 56 for holding the three conductors in proper separated position. Suitable bolts 57 pass through the cleats 55 to clamp them together and to the appropriate vertical framework members 32. These cleats 55 are disposed in line with the terminals 36 of their respective three conductor cable.

The handle 19 is mounted upon the square end of shaft 13. The handle engages suitable stops 70 located on the top plate 10 to limit the normal outer positions of the switch. At these outer positions and also in the center position openings 58 are provided into which may be positioned pin 59 having a knob 65 by which the handle 19 may be turned.

Figure 2:
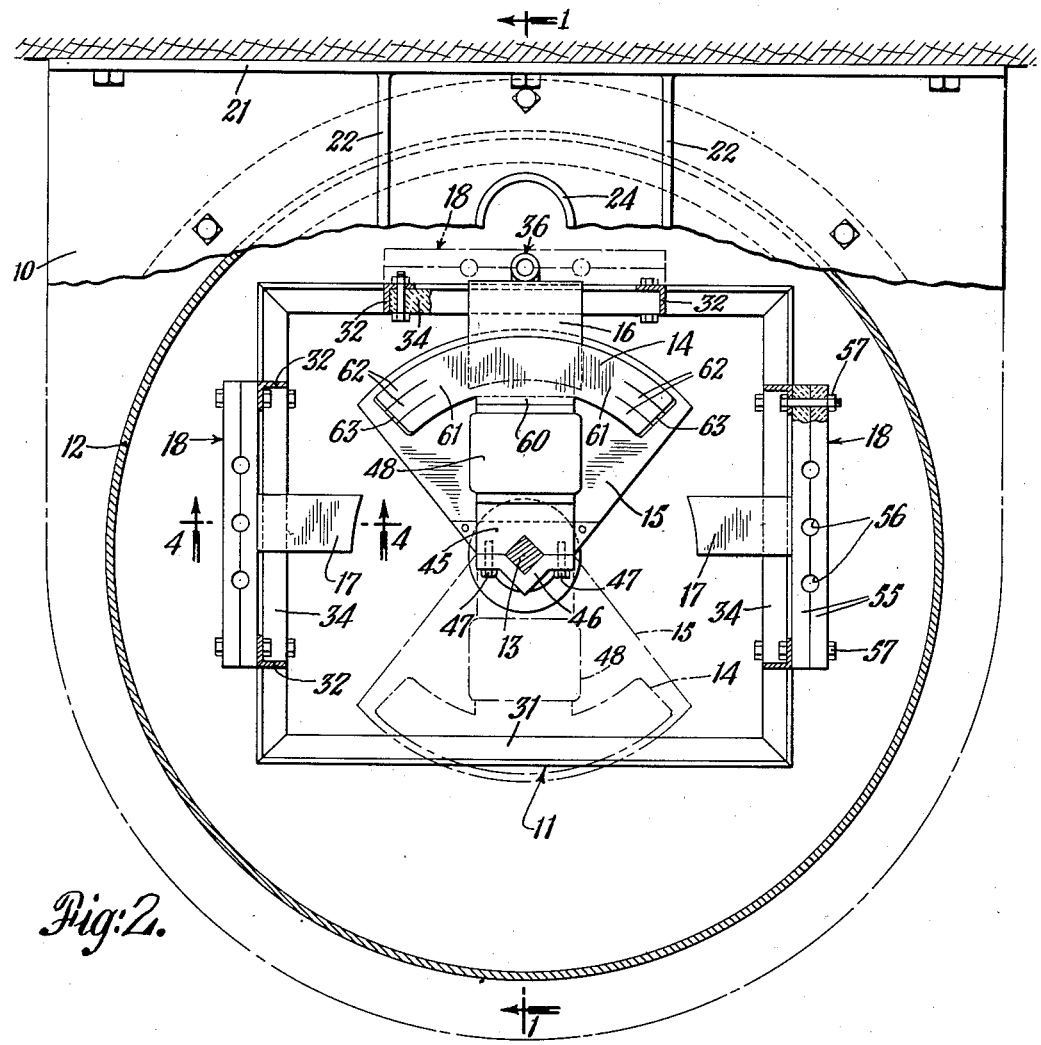
Fig. 2 is a horizontal plan section on the line 2—2 of Fig. 1, with parts in elevation.
Figure 3:
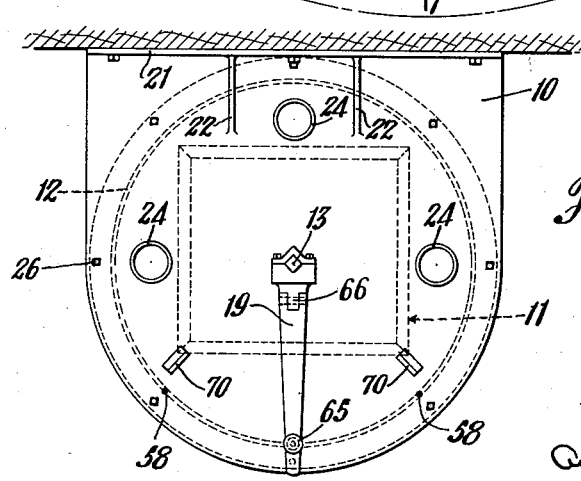
Fig. 3 is a top plan view showing the top plate of the switch.

The handle 19 has a hinge 66 between its hub and outer end to permit the handle to be lifted over stops 70 and bushings 24 whenever it is desired to throw the sector blades 14 to an all clear position as shown in dot-and-dash lines in Fig. 2.

It will be understood that the switch is shown in its central or open position. It may be locked in this position by engagement of the pin 59 in center hole 58. By raising, the handle 19 may be thrown right or left to either extreme normal position to engage stops 70 at which point the pin 59 will drop into end hole 58. Thus the switch may be locked in central open position or in either of the end or closed positions.

An advantage of this switch is the automatic balancing or neutralization of the effect of magnetic forces on shaft 13. The switch has natural balancing properties which minimize the rotative torque placed on the shaft due to magnetic forces tending to blow the switch open.

Thus a disconnect switch has been described which is simple in construction, reliable and safe in operation. It enables a selective power transfer to be made within a single casing, a job which oftentimes requires the use of two gangs of single throw switches mechanically interlocked. The present switch is easy to operate having a convenient central position at which no power is transferred and two selected operative positions at which power is transferred from the source to either of the selected service lines. Such easy operation follows because the stationary contacts or tongues 16 and 17 are gripped only by the resilient fingers 62 at the ends of the sector blades so that the friction due to other parts of the jaws 14 is largely eliminated. The confining of the gripping action of the sector blades on the stationary tongues to the end fingers, in effect, relieves the intermediate parts of the jaws from exerting pressure on the tongues. The end stops 70 and pin holes 58 facilitate throwing and locking the switch in its selected operating positions.

The all clear position is especially advantageous in cases where it is desired to work on the switch when all three terminals are alive. The switch can be thrown to this position simply by raising the handle 19 and moving it around to the all clear position as indicated in the drawing. The all clear position facilitates repair and maintenance of the movable blades, as for example, smoothing them down and tightening the jaws if necessary. The all clear position is conveniently located in the front of the switch where the parts are accessible.

Due to the laying out of the median line of the sector jaws 14 on the arc of a circle and their circumferential bridging of the circumferentially spaced stationary tongues 16, 17, the movable post type insulators are enabled to move into close proximity to the stationary insulators, separated only by the space required for the sandwiched jaw and tongue contacts. This reduces the geometrical size of the switch without reducing the height of the post type insulators.

The flat sector jaws and flat tongues permit the handling of relatively large amounts of current without overheating. These parts may be silver plated to reduce contact electrical resistance.

The rigid mounting of the switch arms on a rugged square shaft and the use of sturdy post type insulators and the rigid connection of the sector blades to the insulators reduces to a minimum the chance of the blades getting loose or the blades failing to move when the switch shaft is operated.

The use of a metal shaft not only gives great mechanical strength but provides a positive method of grounding the switch operating mechanism for the operator's protection.

The barriers which extend radially and circumferentially beyond the periphery and ends of the sector blades reduce short circuits from phase to phase and confine a short circuit from any single phase to ground, to that phase. This feature is desirable since single phase short circuits are generally not as severe as multi-phase short circuits. In addition, the shaft provides a convenient mounting for the barrier and carries the barrier along with the sector blades so that the barrier is always located at a position where the arc is likely to occur.

The tank 12 is shown as filled with a suitable dielectric liquid. This is especially desirable in places having explosive mixtures such as powder factories and oil refineries where even a slight spark might be disastrous. However, in most cases the switch may be used in air with or without the protecting tank. In this case the barriers are especially desirable.

By "post type insulator" or "insulator post" or "post insulator" in the several claims, I mean an insulator which is secured to the shaft by means engaging the inner end of the insulator; which is secured to the arch-shaped bridging contact by means engaging the outer end of the insulator; whose main body projects radially from one side of the shaft; and in which the insulator provides substantial creepage distance between these inner and outer ends. The particular manner in which the shaft and the arch-shaped bridging contact is secured to the insulator is immaterial.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a multi-phase multi-throw disconnect switch, a top plate, a metal framework depending therefrom, said metal framework comprising a top frame secured to the top plate and a bottom frame, sets of vertical members connecting said top and bottom frames, two vertical members on a side for central and end contacts, insulator bars connecting the vertical members of said sets, central stationary contact tongues secured to corresponding bars, end stationary contact tongues secured to corresponding bars, a square metal shaft journaled in said lower frame and in said top plate, fittings secured to said square shaft, detachable caps bolted to said fittings, radially projecting post insulators secured to certain of said fittings, circumferentially extending sector jaws connected to said post insulators, said sector jaws having positions connecting the central tongues selectively with the end tongues, insulating barriers connected to certain fittings and located between and beyond the sector jaws.

2. In a power disconnect switch, a frame, a metal shaft journaled in said frame, a post type movable insulator substantially fixedly secured to said shaft and projecting radially therefrom, a circumferentially extending sector-shaped bridging contact substantially fixedly secured to the outer end of said insulator and arching over said insulator, stationary contacts spaced circumferentially from each other and radially the same distance from said shaft, said stationary contacts being adapted to be spanned by said bridging contact, all said contacts being planar and having their planes substantially perpendicular to said shaft, said insulator extending a distance substantially equal to the radial distance of the inner edges of said stationary contacts from said shaft, and stationary insulators mounted on said frame for supporting said stationary contacts.

3. In a multi-phase power disconnect switch, a frame, a metal shaft journaled in said frame, a plurality of axially spaced, radially projecting, post type insulators rigidly affixed to said shaft, said insulators corresponding to the phases, a plurality of arch shaped bridging contacts substantially fixedly secured at their midpoints to the outer ends of their respective insulators and arching over said insulators, sets of circumferentially spaced stationary contacts, there being one set for each phase, said stationary and bridging contacts all being planar with their planes substantially perpendicular to said shaft, and stationary insulators mounted on said frame for supporting said stationary contacts, the median lines of said arch shaped contacts defining the arcs of circles whose centers are on the axis of said shaft.

4. In a power disconnect switch, a frame, a metal shaft journaled in said frame, a fixture substantially rigidly secured to said shaft, a radially projecting, post type insulator substantially fixedly secured to said fixture, an arch-shaped bridging contact substantially fixedly secured at its midpoint to the outer end of said insulator, said fixture, insulator and bridging contact constituting a cantilever switch arm, stationary contacts spaced circumferentially from each other and being located the same distance from said shaft, said stationary contacts being adapted to be spanned by said bridging contact, stationary insulators mounted on said frame for supporting said stationary contacts, said post type insulator extending radially a distance substantially equal to the radial distance of said stationary contacts from said fixture, said arch-shaped bridging contact extending circumferentially of the shaft and arching over said post type insulator in such manner that the insulator is intersected by a chord connecting the ends of said bridging contact, whereby to minimize the maximum radius of said cantilever switch arm while retaining maximum creepage distance and air gap from the arch-shaped contact to the metal shaft.

5. In a multi-phase, power, disconnect switch, a metal shaft, radially projecting insulators rigidly secured to said shaft, contacts rigidly secured to the outer end of said insulators, said insulators and contacts forming movable cantilever switch arms, said arms being aligned axially of said shaft, a frame in which said shaft is journaled, stationary contacts carried by said frame, said stationary contacts being aligned axially of said shaft, said movable and stationary contacts constituting poles corresponding to the phases, said poles being comparatively widely spaced to obtain the benefit of substantial air gaps suitable for medium to high voltages, planar, segmentary insulating barriers rigidly secured to said shaft, said barriers being aligned axially of said shaft with said movable contacts, said barriers being located substantially midway between said poles, said barriers extending radially beyond said movable contacts, said barriers being of limited circumferential extent but extending circumferentially beyond said movable contacts, whereby to lengthen the flashover path between poles where said movable contacts engage or disengage said stationary contacts and to confine any resulting flashover to a single phase.

6. In a multi-throw, power, disconnect switch, a frame, a metal shaft journaled in said frame, a post type insulator radially projecting from and rigidly secured to said shaft, arch-shaped bridging jaws substantially fixedly secured at their midpoints to the outer end of said insulator, a set of circumferentially spaced stationary tongues comprising a central tongue and end tongues on either side of said central tongue, said tongues and jaws being substantially planar and having their planes substantially perpendicular to said shaft, stationary insulators mounted on said frame for supporting said stationary tongues, said arch-shaped bridging jaws extending circumferentially of the shaft and arching over said post type insulator in such manner that the insulator is intersected by a chord connecting the ends of said bridging jaws, whereby said movable insulator moves past said stationary insulators in close proximity thereto separated by substantially only the space necessary for the interfitting tongues and jaws, the space between said jaws being open throughout their entire circumferential extent to permit free movement of said shaft to cause said bridging jaws to engage said central tongue selectively with either one end tongue or the other.

7. In a disconnect switch, a metal shaft, a post type insulator substantially fixedly secured to said shaft and projecting radially therefrom, a sector jaw substantially fixedly secured to the outer end of said insulator, said jaw comprising spaced blades extending circumferentially and arching over said insulator on either side thereof, said blades having resilient end contact fingers, a set of circumferentially-spaced, stationary tongues, said sector jaw blades being sufficiently long circumferentially to bridge said tongues, said tongues and jaw blades being disposed in planes perpendicular to the axis of said shaft, said contact fingers having circumferentially flaring, radial edges to facilitate engagement with said tongues, said jaw blades being relieved between said fingers to minimize friction with said tongues, as the length of the sector jaw slides along a tongue.

8. In a multi-pole switch, a metal shaft, a plurality of radially projecting insulator posts spaced axially of said shaft and substantially fixedly secured to said shaft, planar bridging contacts substantially fixedly secured to the outer ends of said insulator posts, sets of circumferentially spaced, stationary planar contacts, there being one set for each bridging contact, said bridging contacts extending circumferentially a sufficient distance to bridge adjacent contacts of their respective sets of stationary contacts, said contacts being disposed in planes perpendicular to the axis of said shaft, segmentary planar barriers substantially fixedly secured to said shaft and movable therewith, said barriers being disposed between, in line with, and substantially spaced from, said bridging contacts, said barriers extending substantially beyond said bridging contacts both radially and circumferentially thereof so as to confine any arc drawn between a stationary contact and a bridging contact to the space between adjacent barriers.

9. In a double throw, multi-pole, disconnect switch, a metal shaft, a plurality of post type insulators spaced axially and substantially fixedly secured to said shaft, sector jaws substantially fixedly secured to the ends of said insulators and arching over said insulators on either side, sets of circumferentially spaced, stationary tongues, there being a set of three tongues for each sector jaw, said sector jaws extending circumferentially a distance sufficient to bridge adjacent tongeus of their respective sets of stationary tongues, said tongues and jaws being planar and disposed in planes perpendicular to the axis of said shaft, sector shaped planar barriers substantially fixedly secured to said shaft and movable therewith, said barriers being disposed between, in line with, and spaced from said sector jaws, said barriers extending substantially beyond said sector jaws both radially and circumferentially thereof so as to confine any arc drawn between a tongue and a sector jaw to the space between adjacent barriers.

10. In a multi-phase, multi-throw, disconnect switch, a frame, an operating shaft journaled in said frame, radially projecting post type insulators substantially fixedly secured to said shaft and corresponding to the phases, substantially circumferentially extending bridging contacts substantially fixedly secured to the outer ends of said insulators, central and end stationary insulators secured to said frame and corresponding to the phases, stationary central and end contacts secured to said last-mentioned insulators, said shaft being rotatable to cause said bridging contacts to bridge said central contacts selectively with the end contacts on either side of the central contacts, the arc spanned by the spacing of said stationary contacts being such as to leave a free arc longer than the arc of said bridging contacts, whereby said shaft has an all free position wherein said bridging contacts are free of all said stationary contacts and are accessible to a workman.

11. In a multi-phase, double throw, disconnect switch, a grounded frame having a relatively closed part and a relatively open part, a metal operating shaft journaled in said frame, radially projecting post type insulators substantially fixedly secured at their inner ends to said shaft and corresponding to the phases, sector jaws substantially fixedly secured at their midpoints to the outer ends of said insulators and arching over their respective insulators on either side, central and end stationary insulators attached to the relatively closed part of said frame and corresponding to the phases, stationary central and end contact tongues attached to said last-mentioned insulators, said shaft being rotatable to cause said sector jaws to bridge said central tongues selectively with the end tongues on either side of the central tongues, the arc spanned by the spacing of said stationary tongues being such as to leave a free arc longer than the arc of said sector jaws, whereby said shaft has an all free position wherein said sector jaws are free of all said stationary tongues and are accessible through the relatively open part of said frame.

12. In a multi-phase, multi-throw, disconnect switch for use primarily to carry sizable amounts of electric power with relatively heavy currents at medium to high voltages and to open and close its circuits under substantially no load, a frame, a metal operating shaft journaled in said frame, radially projecting post type insulators substantially fixedly secured to said shaft and corresponding to the phases, substantially circumferentially extending arch-shaped bridging contacts substantially fixedly secured to the outer ends of said insulators and arching over said insulators on either side, central and end stationary insulators secured to said frame and corresponding to the phases, stationary central and end contacts secured to said last-mentioned insulators, said shaft being rotatable to cause said bridging contacts to bridge said central contacts selectively with the end contacts on either side of said central contacts.

FRANK W. REILLY.

REFERENCES CITED

The following references are of record in the file of this patent:

UNITED STATES PATENTS

| Number | Name | Date |
|---|---|---|
| 871,970 | Stull | Nov. 26, 1907 |
| 995,774 | Dow | June 20, 1911 |
| 1,683,196 | Kempton | Sept. 4, 1928 |
| 1,833,176 | Rah | Nov. 24, 1931 |
| 2,123,976 | Van Antwerp | July 19, 1938 |
| 2,366,784 | Hawley | Jan. 9, 1945 |

FOREIGN PATENTS

| Number | Country | Date |
|---|---|---|
| 230,748 | Great Britain | Mar. 19, 1925 |
| 617,753 | France | Nov. 29, 1926 |
| 801,993 | France | May 8, 1935 |